(12) United States Patent
Bailey

(10) Patent No.: US 6,428,922 B2
(45) Date of Patent: *Aug. 6, 2002

(54) ELECTROCHEMICAL CELL INCORPORATING AN EXTERNAL HYDROGEN REMOVING AGENT

(75) Inventor: Jean W. Bailey, Columbia Station, OH (US)

(73) Assignee: Eveready Battery Company, Inc., St. Louis, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,273

(22) Filed: Feb. 5, 1999

Related U.S. Application Data

(60) Provisional application No. 60/080,950, filed on Apr. 7, 1998.

(51) Int. Cl.$^7$ .......................... H01M 10/52; H01M 2/12
(52) U.S. Cl. ............................ 429/57; 429/53
(58) Field of Search ..................... 429/57, 53; 29/623.1

(56) References Cited

U.S. PATENT DOCUMENTS

| | | | |
|---|---|---|---|
| 3,622,398 A | * 11/1971 | Sekido et al. | |
| 3,893,870 A | 7/1975 | Kozawa | |
| 3,943,937 A | 3/1976 | King et al. | 128/419 |
| 3,953,872 A | 4/1976 | Bloom et al. | 354/275 |
| 4,054,727 A | 10/1977 | O'Nan et al. | 429/86 |
| 4,127,134 A | * 11/1978 | Ushakoff | 429/57 X |
| 4,448,860 A | 5/1984 | von Alpen et al. | 429/57 |
| 4,716,736 A | * 1/1988 | Schwarz | 165/104.12 |
| 4,925,747 A | * 5/1990 | Kordesch et al. | 429/59 |
| 5,162,169 A | * 11/1992 | Tomantschger et al. | 429/206 |
| 5,281,497 A | * 1/1994 | Kordesch et al. | 429/224 |
| 5,349,507 A | 9/1994 | Parker | 362/158 |
| 5,483,228 A | 1/1996 | Bailey et al. | 340/632 |
| 5,532,074 A | * 7/1996 | Golben | 429/53 |
| 5,535,107 A | 7/1996 | Prok | 362/158 |
| 5,837,158 A | 11/1998 | Shepodd et al. | 252/181.6 |

FOREIGN PATENT DOCUMENTS

| | | | |
|---|---|---|---|
| EP | 0075132 | | 3/1983 |
| EP | 0605734 | | 7/1994 |
| GB | 2091934 | | 8/1982 |
| GB | 2286680 | | 8/1995 |
| JP | 57148884 | | 9/1982 |
| JP | 57205975 | | 12/1982 |
| JP | 60127670 | | 7/1985 |
| JP | 61019068 | | 1/1986 |
| JP | 63-231882 A | * | 9/1988 |
| JP | 7-192775 | * | 7/1995 |
| JP | 07302623 | | 11/1995 |
| JP | 09115491 | | 5/1997 |
| WO | 9117581 | | 11/1991 |

OTHER PUBLICATIONS

Smith, H.M.; Shepodd, T.J.; and Gilliom, L.R. "Organic Getter Materials for the Removal of Hydrogen and its Isotopes" Aug. 1990, 13 pages.

* cited by examiner

*Primary Examiner*—Patrick Ryan
*Assistant Examiner*—Jonathan Crepeau
(74) *Attorney, Agent, or Firm*—Stewart A. Fraser

(57) ABSTRACT

A battery having a hydrogen removing agent disposed on the battery external from the active cell volume of its container for removing hydrogen produced by the electrochemically active materials. The hydrogen removing agent is disposed on a surface of the seal member which is disposed within an open top end of the container, according to one embodiment. According to other embodiments, the hydrogen removing agent is disposed on an inner surface of an outer cover, or disposed on a label on the outside walls of the container. A multi-cell battery is also provided having the hydrogen removing agent disposed on the interior walls thereof.

4 Claims, 3 Drawing Sheets

ELECTROCHEMICAL CELL INCORPORATING AN EXTERNAL HYDROGEN REMOVING AGENT

CROSS REFERENCE TO RELATED APPLICATION

This application claims the benefit of U.S. Provisional Application No. 60/080,950, filed Apr. 7, 1998, entitled "ELECTROCHEMICAL CELL INCORPORATING AN EXTERNAL HYDROGEN RECOMBINATION CATALYST," the disclosure of which is incorporated herein.

BACKGROUND OF THE INVENTION

The present invention generally relates to batteries and, more particularly, to removing hydrogen released from batteries, and is particularly useful for batteries used in sealed compartments such as in a packaged camera, a sealed flashlight, or other sealed device.

Conventional alkaline electrochemical cells generally include a steel cylindrical can having a positive electrode, referred to as the cathode, which comprises manganese dioxide as the active material, and is generally formed against the interior surface of the steel can. The electrochemical cell also includes a negative electrode, referred to as the anode, which comprises zinc powder, and is generally centrally disposed in the can. A separator is located between the anode and the cathode, and an alkaline electrolyte solution simultaneously contacts the anode, the cathode, and separator. A conductive current collector is commonly inserted into the anode active material and a seal assembly, which includes a seal member, provides closure to the open end of the cell's steel can to seal the active electrochemical materials in a sealed volume.

Standard alkaline cells are commercially available for providing an open circuit voltage of about 1.5 volts. When a higher voltage is required, it is common practice to combine multiple cells to form a battery having the required voltage. In doing so, a plurality of cells are commonly housed in a container and are electrically connected in series. Additionally, external terminals are attached to the outside of the container for making an electrical connection with the cells.

It is generally known that small amounts of hydrogen are produced inside an alkaline cell due to corrosion of the zinc anode. Typically, a portion of the hydrogen accumulates inside the sealed volume of the battery, while some of the hydrogen permeates through and around the seal, and therefore escapes from the cell's closed volume. Additionally, ventable seals are often used which open and release hydrogen when excessive pressure builds up in the closed volume. Excessive accumulation of hydrogen can present potentially unacceptable conditions, particularly in sealed compartments. For example, hydrogen may become concentrated in the sealed battery compartment of a flashlight or other electrically-operated device, and can potentially lead to problems in operating the device. As another example, the concentration of hydrogen in a disposable camera that is commercially made available in a sealed airtight package may adversely reduce silver in the photographic film and fog the film, thereby degrading the camera's photographic film.

Hydrogen getters and recombination catalysts have been available to remove hydrogen. For example, it has been known that hydrogen absorbing materials, such as hydrogen getters, and recombination catalysts, can be used to counteract hydrogen accumulation, by disposing the hydrogen removing material in the sealed battery compartment of a device such as a flashlight. However, only certain selected electrically-operated devices are made available with a hydrogen removing material. In addition, damage or breakdown of the hydrogen removing agent over time may reduce its effectiveness in the device.

Accordingly, it is desirable to reduce the hydrogen accumulation that may be present in or around a battery. In addition, it is desirable to provide for removal of an accumulation of hydrogen gas from a battery for use in sealed battery-operated devices. Further, it is desirable to remove hydrogen emitted from batteries in a flashlight, a camera, or other similar devices.

SUMMARY OF THE INVENTION

The present invention provides for the removal of hydrogen generated by a battery by providing the battery with a hydrogen removing agent. A battery is provided having walls defining a volume and including an active cell volume for housing active cell materials. Electrochemically active materials are contained in the active cell volume of the container. The battery further includes a hydrogen removing agent disposed on the battery external from the active cell volume of the container for removing hydrogen produced by the electrochemically active materials. According to one embodiment, the hydrogen removing agent is disposed on the surface of a seal member that is disposed within an open top end of the container. According to another embodiment, the hydrogen removing agent is disposed on an inner surface of an outer cover of the battery. According to yet another embodiment, the hydrogen removing agent is disposed on a label on the outside walls of the container. According to a further embodiment, the hydrogen removing agent is disposed on the interior walls of a multi-cell battery.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figures 1, 2:
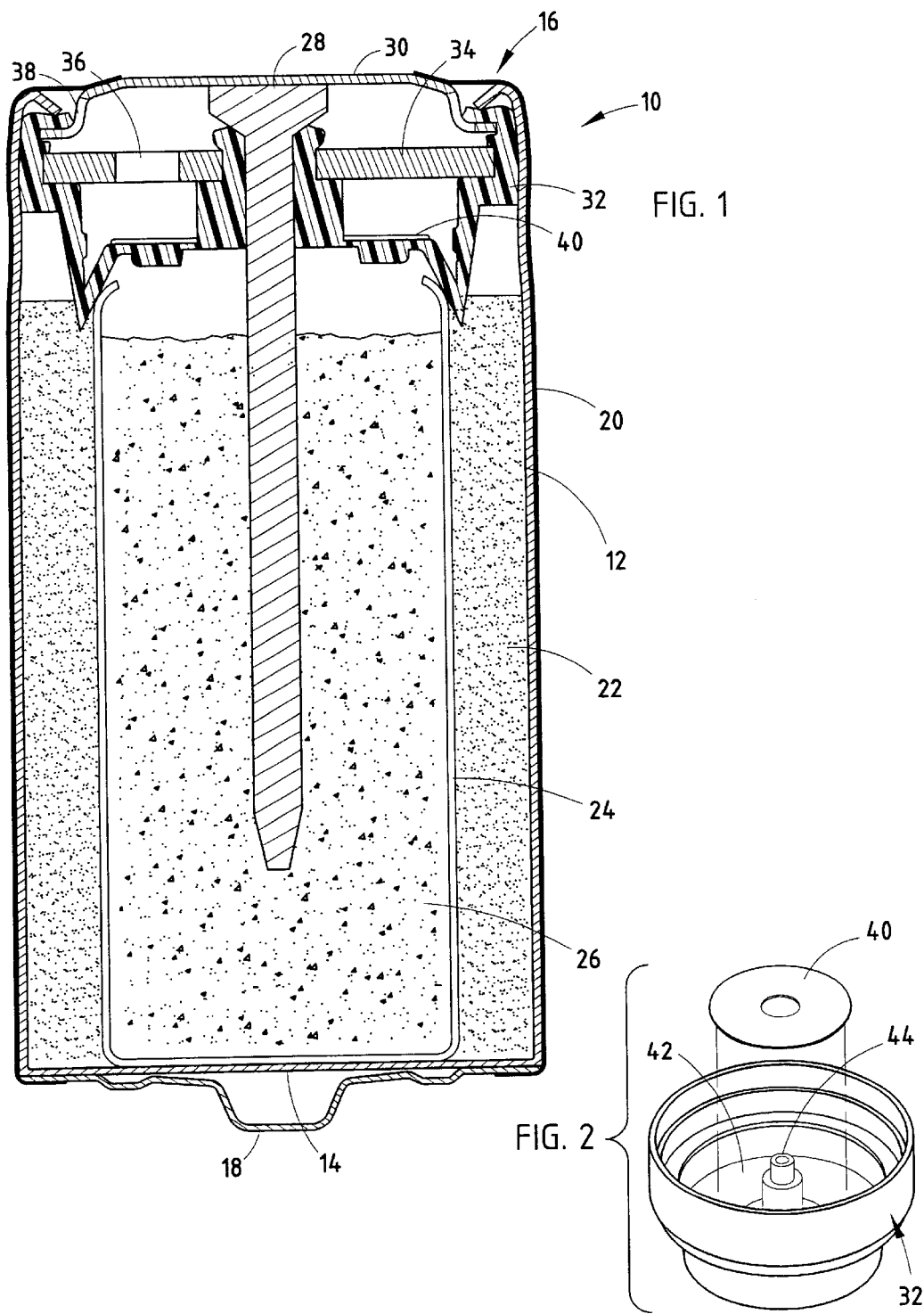
FIG. 1 is a longitudinal cross-sectional view of an electrochemical cell having a hydrogen removing agent disposed on the top surface of an annular seal member according to a first embodiment of the present invention.
FIG. 2 is an exploded perspective view of the annular seal member containing the hydrogen removing agent as shown in FIG. 1.

Referring to FIG. 1, a cylindrical alkaline electrochemical cell 10 is shown therein. Alkaline cell 10 includes a cylindrical steel can 12 having a closed bottom end 14 and an open top end 16. The closed bottom end of can 12 further includes a positive cover welded or otherwise attached thereto and formed of plated steel with a protruding nub 18 at its center region which forms the positive contact terminal of cell 10. Assembled to the open end 16 of the steel can 12 is a cover and seal assembly which forms the negative contact terminal of cell 10. A metalized, plastic film label 20 is formed about the exterior surface of steel can 12, except for the ends of steel can 12. Film label 20 is formed over the peripheral edge of the positive cover.

A cathode 22, preferably formed of a mixture of manganese dioxide, graphite, forty-five percent potassium hydroxide solution, and additives is formed about the interior surface of steel can 12. A separator 24, which is preferably formed of a non-woven fabric that prevents migration of any solid particles in the cell, is disposed about the interior surface of cathode 22. An anode 26, preferably formed of zinc powder, a gelling agent, and additives, is disposed with an electrolyte inside the separator 24 and is in contact with a current collector 28, which may include a brass nail. Accordingly, the cathode 22 is configured as the cell's positive electrode, and the anode 26 is configured as the cell's negative electrode.

The current collector 28 contacts an outer negative cover 30 which forms the negative contact terminal of cell 10. An annular nylon seal 32 is disposed in the open end 16 of the steel can 12 to prevent leakage of the active cell ingredients contained in steel can 12. Nylon seal 32 contacts a metal washer 34 which forms an inner cell cover, and is preferably formed of steel. The outer negative cover 30 is preferably formed of plated steel, and may be held in contact with current collector 28 via pressure contact or a weld. It should be appreciated that the outer negative cover 30 is electrically insulated from the steel can 12 by way of nylon seal 32. In addition, the inner cover 34 includes one or more vent openings 36. The outer negative cover 30 also includes one or more openings 38 to vent pressure build-up from within the cell 10 to the outside atmosphere. Together, the current collector 28, seal 32 and inner cover 34 form the cover and seal assembly that is inserted into the open end 16 of can 12 to seal the active ingredients therein.

While the active ingredients are sealed in the can 12 in an active cell volume thereof, it should be understood that hydrogen accumulation may develop in the active seal volume of the container due to corrosion of the zinc anode. As is common with electrochemical cells, the hydrogen gas is in the form of very small molecules which are capable of being released from the active cell volume of the container by permeating the seal 32, particularly between the current collector 28 and seal 32. To prevent excessive pressure build-up in the sealed volume of the container, a pressure release vent (not shown) may be provided in the seal 32 to open at a predetermined internal pressure to vent internal pressure, including hydrogen, from within the sealed volume of the can 12.

According to the present invention, a hydrogen removing agent 40 is disposed on the electrochemical cell 10 external to the active cell volume of the can 12. According to a first embodiment as shown in FIGS. 1 and 2, the hydrogen removing agent 40 is disposed on a top surface 42 of the annular seal 32. While the hydrogen removing agent 40 is shown in the form of a thin circular disk having an opening through which an axial boss 44 of seal 32 extends, it should be appreciated that the hydrogen removing agent may be provided in various shapes, sizes, and locations. The hydrogen removing agent 40 is applied to the surface 42 of the annular seal 32 external to the cell's electrochemically active components, yet it is within the overall volume of the battery such that it is exposed to hydrogen which leaks from the electrochemically active volume of the cell to the outside environment. The hydrogen removing agent 40 removes at least some, and preferably a substantial amount, of the hydrogen accumulation so that excessive hydrogen accumulation can be prevented. This hydrogen removal is especially advantageous when the electrochemical cell 10 is employed in a sealed enclosure such as a flashlight or a camera, as well as other applications.

The hydrogen removing agent 40 may include any of a number of available agents that effectively remove hydrogen. For example, the hydrogen removing agent 40 may include a hydrogen recombination catalyst or a hydrogen getter, both of which are known to remove hydrogen. One example of a known hydrogen getter is disclosed in U.S. Pat. No. 5,837,158, entitled "POLYMER FORMULATIONS FOR GETTERING HYDROGEN," the disclosure of which is incorporated herein by reference. Hydrogen getters, such as that disclosed in the aforementioned patent, remove hydrogen accumulation by providing a controlled reaction between an organic reactant and hydrogen. One example of a hydrogen recombination catalyst for use as the hydrogen removing agent 40 may include a hydrogen recombination catalyst which causes hydrogen and oxygen to combine and produce water. Another example of a suitable hydrogen recombination catalyst is disclosed in U.S. Pat. No. 3,893,870, entitled "HYDROGEN ABSORBING MATERIAL FOR ELECTROCHEMICAL CELLS," the disclosure of which is also incorporated herein by reference. It should be appreciated that other known hydrogen removing agents may be employed for use in the battery, according to the present invention.

The hydrogen removing agent 40 may be applied to the surface of seal 32 by any of a number of known application techniques including, but not limited to, spraying, painting, printing, or other application techniques. The hydrogen removing agent 40 could be applied directly to the surface of the seal 32, or could be applied to a carrier surface, such as a tape material, which in turn can be adhered or otherwise applied to the surface of the seal 32. In addition, the hydrogen removing agent 40 can be applied in different shapes, sizes, and locations on the seal 32.

Figure 3:
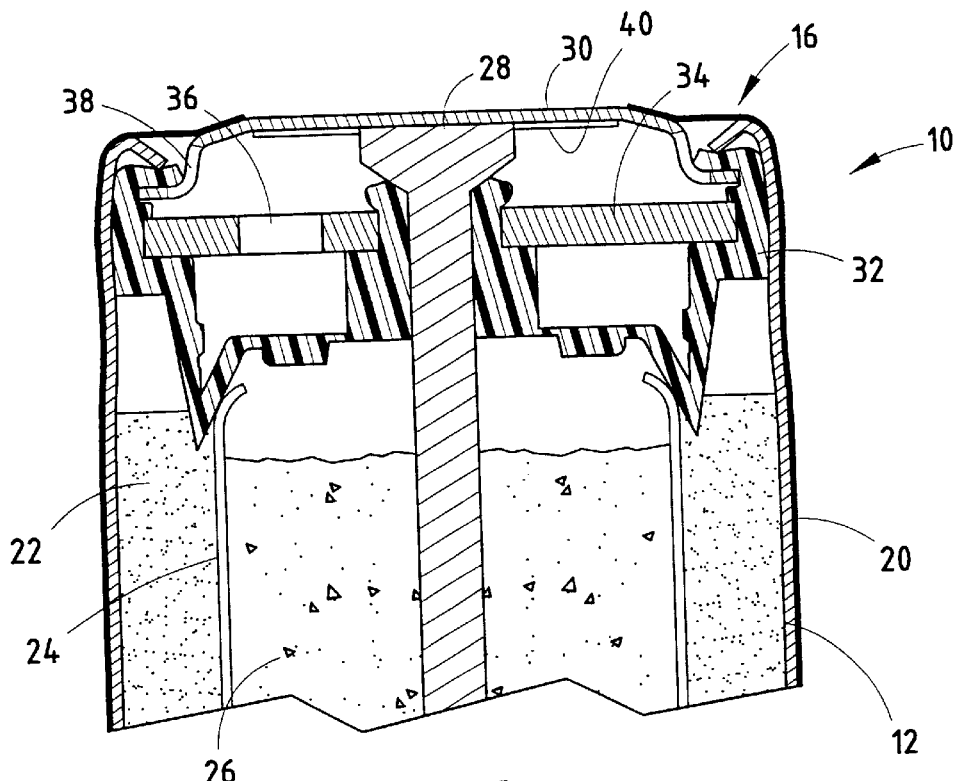
FIG. 3 is a partial longitudinal cross-sectional view of an electrochemical cell having the hydrogen removing agent disposed on a bottom surface of the outer negative cover according to a second embodiment.

Referring to FIG. 3, the hydrogen removing agent 40 is shown disposed on the inside surface of the outer negative cover 30 according to a second embodiment of the present invention. The hydrogen removing agent 40 may be applied to the bottom surface of outer negative cover 30 in various shapes, sizes, and locations, and in a manner similar to that disposed on the seal 32 according to the first embodiment. It should be appreciated that the hydrogen removing agent 40 of the first and second embodiments, is advantageously located external from the internal volume containing the electrochemically active materials of cell 10, yet within the entire volume of the cell 10, and more particularly in the volume defined between the seal 32 and outer negative cover 30. It should also be appreciated that the hydrogen removing agent 40 may be located in other locations on the cell 10 external from the active cell volume containing the electrochemically active materials, without departing from the teachings of the present invention. For example, the hydrogen removing agent 40 could likewise be disposed on the current collector 28 at a location between seal 32 and outer negative cover 30. As another example, the hydrogen removing agent 40 could be disposed on the inner cover 34. Accordingly, the hydrogen removing agent 40 is disposed preferably in a location where it will be exposed to hydrogen released from the active materials of the electrochemical cell 10.

Figure 4:
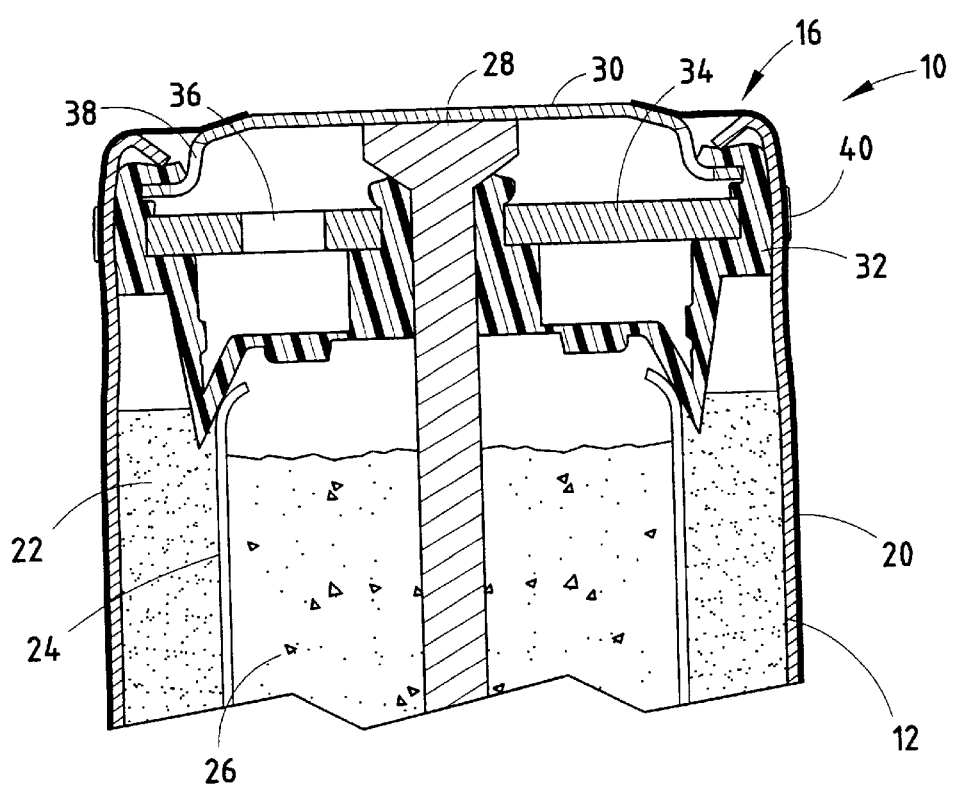
FIG. 4 is a partial longitudinal cross-sectional view of an electrochemical cell having the hydrogen removing agent disposed on an outer can label according to a third embodiment.

Referring to FIG. 4, an electrochemical cell 10 is shown having the hydrogen removing agent 40 disposed outside of the steel can 12 on the outer surface of label 20. In this embodiment, the hydrogen removing agent 40 may be applied in the shape of a ring, and is made available for exposure to hydrogen that is released from the electrochemical cell 10 to the outside atmosphere. It should be appreciated that the hydrogen removing agent 40 may likewise be disposed at other locations on the outside surface of cell 10. For example, the hydrogen removing agent 40 could be disposed on the outer surface of outer negative cover 30. Also, hydrogen removing agent 40 could be disposed on the inner or outer surface of the positive cover. In addition, the hydrogen removing agent 40 could be integrally formed in the label 20.

Figure 5:
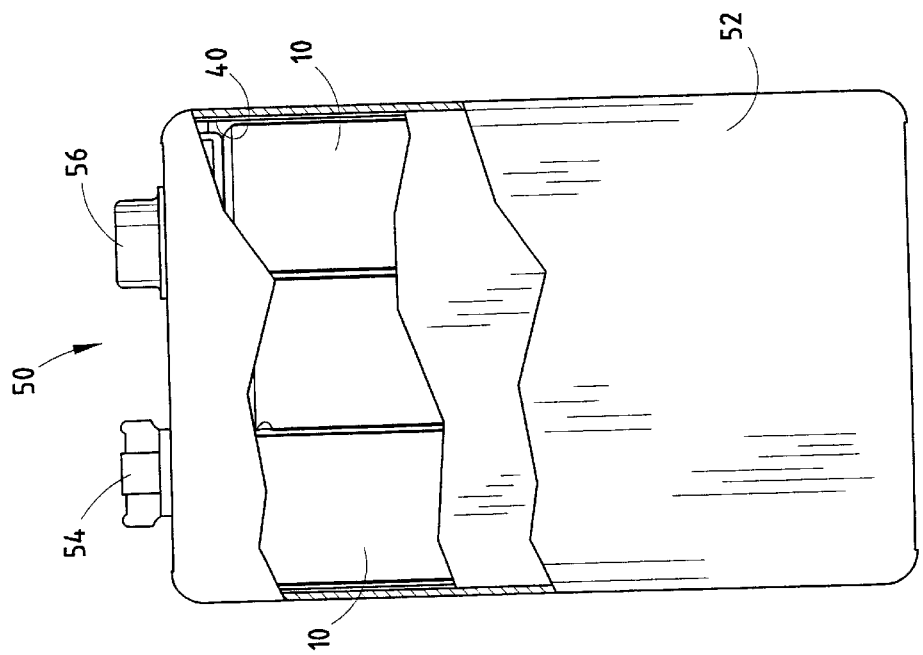
FIG. 5 is a partial cutaway view of a multi-cell battery having a hydrogen removing agent disposed on an inside surface of the battery housing according to a fourth embodiment.

Referring to FIG. 5, a multi-cell battery 50 is illustrated therein which contains a plurality of electrochemical cells 10. The multi-cell battery 50 may include six electrochemical cells 10 connected in series to form a 9-volt battery as is generally known in the battery art. The multi-cell battery 50 includes a container 52 housing the multiple electrochemical cells 10, and has positive and negative contact terminals 54 and 56 provided on the top end of the container 52. The multi-cell battery 50 has the hydrogen removing agent 40 preferably located on an inside surface, such as the inner side walls of the container 52, to remove hydrogen accumulation emitted from the electrochemical cells 10. While the hydrogen removing agent 40 is shown on the inside surface of the side walls of container 52, it should also be appreciated that the hydrogen removing agent 40 may be located on the top or bottom inside walls, or an outer surface of one or more of the electrochemical cells 10, or may be located on an outside surface of the container 52.

Figure 6:
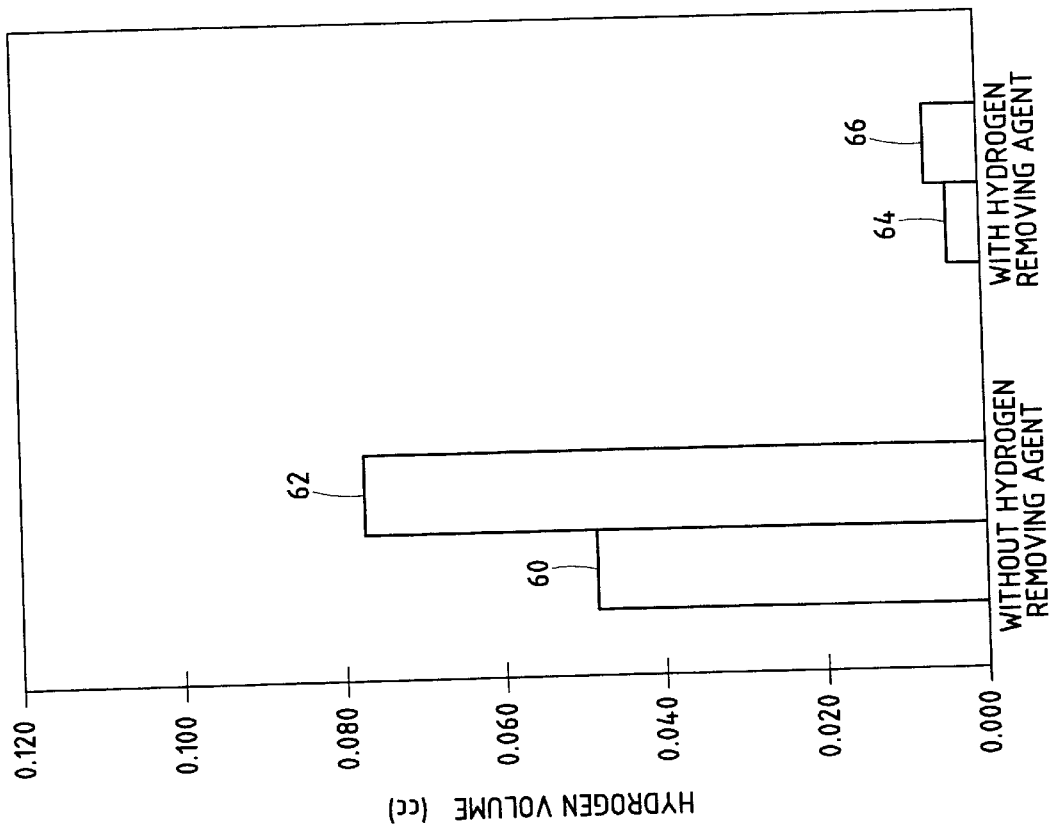
FIG. 6 is a comparative graph illustrating the hydrogen volume that is collected from the electrochemical cell shown in FIG. 3 stored in a sealed container as compared to the hydrogen volume from an electrochemical cell absent the hydrogen removing agent.

With particular reference to FIG. 6, a graph is shown which illustrates the performance of electrochemical cells having a hydrogen removing agent in the form of a hydrogen recombination catalyst applied to the inside surface of outer negative cover 30 as shown in FIG. 3, and compared to similar electrochemical cells absent the hydrogen removing agent 40. In particular, cylindrical alkaline AA-sized cells were tested over a two week period at temperatures of 50° C. and 71° C. Hydrogen volume measurements were taken by placing the cells at the corresponding temperature in a bag for the two week test period. The total volume of air in the bag was measured. The air was analyzed for hydrogen concentration and the volume of air was multiplied by the percentage of hydrogen to arrive at the hydrogen volume measurement. Two cells containing the hydrogen removing agent 40 on the bottom surface of the outer negative cover 30 were tested, and the volume of hydrogen accumulated in each cell was measured. The hydrogen volume measurement for one cell tested at 50° C. is identified by reference numeral 64, and the hydrogen volume measurement for the other cell tested at 71° C. is shown by reference numeral 66. In contrast, the conventional cells, which did not include the hydrogen removing agent, provided much greater hydrogen volume measurements as identified by reference numeral 60 for the 50° C. test, and reference numeral 62 for the 71° C. test. As shown, the hydrogen removing agent 40 significantly reduced the volume of hydrogen accumulation in the cell, when contrasted to the conventional cells not containing the hydrogen removing agent. In addition, the graphs shown in FIG. 6 illustrate that the amount of hydrogen accumulation tends to be greater when the temperature is increased.

Accordingly, a hydrogen removing agent 40 is disposed on an electrochemical cell or battery external to the closed volume containing the electrochemically active materials of the cell to reduce the amount of hydrogen emitted from the cell into the surrounding atmosphere. The electrochemical cell can be employed in an electrically-operated device such as a flashlight or a camera, which often employ a sealed battery compartment. By providing the hydrogen removing agent 40 on the battery, the amount of hydrogen present in the electrically-operated device can be reduced without having to incorporate a hydrogen removing agent directly into the electrically-operated device.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A battery comprising:

a container having walls defining a volume and including a sealed active cell volume for housing active cell materials, the container including a can defining an electrochemical cell and having a closed bottom end and an open top end;

electrochemically active materials contained in said sealed active cell volume of said container;

a hydrogen removing agent disposed on said battery external from said sealed active cell volume of said container for removing hydrogen produced by said electrochemically active materials;

an inner seal member disposed in said open top end of said can to seal said electrochemical materials in said can and define said sealed active cell volume, said inner seal member comprises a ventable annular seal that may vent hydrogen accumulated in said active cell volume of said container; and an outer cover assembled to said open top end of said can, said outer cover and inner seal member defining a container volume therebetween which is external to said sealed active cell volume, wherein said hydrogen removing agent is disposed in said container volume.

2. The battery as defined in claim 1, wherein said hydrogen removing agent comprises a hydrogen recombination catalyst.

3. A battery comprising:

a container having walls defining a volume and including a sealed active cell volume for housing active cell materials, said container comprises a can having a closed bottom end and an open top end and side walls extending between the bottom end and top end;

a seal member disposed within said open top end of said can to close said can and define said sealed active cell volume of said container as the volume between the bottom end and the seal member;

electrochemically active materials contained in said sealed active cell volume of said container wherein said electrochemically active material comprises an anode containing zinc, a cathode containing manganese dioxide, and an alkaline electrolyte; and a hydrogen removing agent disposed on a surface of said seal member external from said sealed active cell volume of said container for removing hydrogen produced by said electrochemically active materials.

4. An electrochemical cell comprising:

a container having a closed bottom end and an open top end;

electrochemically active materials disposed in said container, said electrochemically active materials including a positive electrode and a negative electrode;

a seal member disposed in said open end of said container for containing said electrochemically active materials in a sealed active cell volume of said container, wherein said seal member comprises an annular seal including a top surface located external the sealed active cell volume;

a cover assembled to said open end of said container and enclosing said seal member, said cover and seal member defining a container volume external to said active cell volume; and a hydrogen removing agent disposed on said top surface of said annular seal.

* * * * *